Aug. 1, 1972 — F. KALWAITES — 3,681,184
NONWOVEN FABRICS COMPRISING BAMBOO, DIAMOND
AND THE LIKE PATTERNS
Filed March 24, 1970 — 6 Sheets-Sheet 1

INVENTOR
FRANK KALWAITES
BY
ATTORNEY

Aug. 1, 1972　　F. KALWAITES　　3,681,184
NONWOVEN FABRICS COMPRISING BAMBOO, DIAMOND
AND THE LIKE PATTERNS
Filed March 24, 1970　　6 Sheets-Sheet 2

INVENTOR
FRANK KALWAITES
BY
ATTORNEY

INVENTOR
FRANK KALWAITES
BY
ATTORNEY

Aug. 1, 1972 F. KALWAITES 3,681,184
NONWOVEN FABRICS COMPRISING BAMBOO, DIAMOND
AND THE LIKE PATTERNS
Filed March 24, 1970 6 Sheets-Sheet 4

INVENTOR
FRANK KALWAITES
BY
ATTORNEY

INVENTOR
FRANK KALWAITES
BY
ATTORNEY

Aug. 1, 1972          F. KALWAITES                3,681,184
         NONWOVEN FABRICS COMPRISING BAMBOO, DIAMOND
                    AND THE LIKE PATTERNS
Filed March 24, 1970                              6 Sheets-Sheet 6

INVENTOR
FRANK KALWAITES
BY
ATTORNEY

United States Patent Office 3,681,184
Patented Aug. 1, 1972

3,681,184
NONWOVEN FABRICS COMPRISING BAMBOO,
DIAMOND AND THE LIKE PATTERNS
Frank Kalwaites, Somerville, N.J., assignor to
Johnson & Johnson
Filed Mar. 24, 1970, Ser. No. 22,300
Int. Cl. D04h 1/46, 1/70
U.S. Cl. 161—109
9 Claims

ABSTRACT OF THE DISCLOSURE

A nonwoven fabric having a plurality of patterns of groups of fiber segments that alternate and extend throughout the fabric. One of the patterns comprises a plurality of yarn-like bundles of fiber segments that define apertures or holes or other areas of low fiber density located in discontinuous portions of the fabric. The discontinuous portions of the fabric are bounded around their perimeters by a second continuous pattern of yarn-like bundles of fiber segments.

The present invention relates to nonwoven fabrics, and more particularly to patterned nonwoven fabrics made from a layer of fibrous material such as a fibrous web wherein the individual fiber elements are capable of movement under the influence of applied fluid forces. The first pattern in the fabric is a pattern of yarn-like bundles of closely associated and substantially parallel fiber segments that define apertures (holes) or other areas of low fiber density in discontinuous portions of the fabric. The second pattern is a pattern of yarn-like bundles of fiber segments in continuous portions of the fabric that lie between and interconnect the discontinuous portions of the fabric.

BACKGROUND OF INVENTION

For a number of years now, there have been known various types of foraminous or apertured nonwoven fabrics made by processes involving the rearrangement of fibers in a starting web or fabric of nonwoven fibers. Some of these fabrics and methods of manufacture are illustrated, shown and described in U.S. Pats. 2,862,251; 3,081,500; 3,081,512; 3,081,514 and 3,081,515. The fabrics disclosed and claimed in the patents just listed contain apertures or holes or other areas of low fiber density outlined by interconnected bundles of fibrous elements wherein the fiber segments within the bundle are closely associated and substantially parallel and have a yarn-like configuration. The term "areas of low fiber density" is used in this specification and claims to include both areas in which relatively few fibers in comparison to the rest of the fabric are found and apertures (holes) that are substantially or entirely free of fibers. Such fabrics will be hereinafter referred to as "bundled rearranged" nonwoven fabrics.

Bundled rearranged nonwoven fabrics have been made commercially for many years. In most instances, these fabrics have had an overall pattern of holes or other low fiber density areas throughout the fabric.

A method for producing bundled rearranged nonwoven fabrics is to support a loose fibrous web or layer on a permeable backing member and apply sets of opposing fluid forces to the layer while thus supported. The fluid by which such forces are applied passes through the fibrous layer over the backing member and then through the backing member to pack various groups of fibers elements and to place these elements into closer proximity and substantial parallelism to form interconnected bundles of fiber segments. In accomplishing this result, the fluid forces usually are applied over the entire surface of the loose fibrous web or layer and uniformly over and through the permeable backing or support member to produce fiber bundles uniformly over the entire fabric. In some instances, patterns can be made in the fabric by not applying fluid forces to predetermined areas of the fibrous layer thereby preventing rearrangement in these areas.

SUMMARY OF INVENTION

I have discovered a novel nonwoven fabric which comprises a layer of intermingled fibers with the fibers arranged to define a plurality of patterns. The first pattern is located in discontinuous areas of the fabric. These discontinuous areas comprise a plurality of yarn-like bundles of fiber segments that define apertures or holes or other areas of low fiber density. The fiber segments in each of the bundles are closely associated with other fiber segments in the bundle and lie generally parallel to the longitudinal axis of the bundle. The yarn-like bundles of fiber segments are interconnected with other bundles at junctures by groups of fibers common to a plurality of bundles. The fibers at said junctures are oriented in a plurality of diverse directions. The discontinuous portions of the fabric are bound around their perimeter by a second pattern of yarn-like bundles. This second pattern of yarn-like bundles is continuous throughout the fabric. The yarn-like bundles of the second pattern may be of a different weight than the yarn-like bundles in the first discontinuous portions of the fabric.

In certain embodiments of the present invention, the yarn-like bundles in the predetermined continuous portions of the fabric are heavier than the yarn-like bundles in the discontinuous portions of the fabric. Also, in certain other embodiments, the yarn-like bundles in the continuous portions of the fabric will extend longitudinally and transverse of the fabric while in other embodiments, they may extend in various other continuous shapes throughout the fabric. The discontinuous portions of the fabric may have various shapes; that is, square, round, hexagonal, etc.

Surprisingly, even though my new fabric has a plurality of patterns which extend throughout the fabric, the patterns have substantial regularity and aid in providing a fabric having considerably aesthetic appeal. Furthermore, not only does my new fabric have substantial uniformity in its areas of low fiber density or holes, but unexpectedly, my new fabric has uniformity in the patterns of bundles of fiber segments, including both the pattern of bundles in the discontinuous portions of the fabric and the pattern of bundles which bound the perimeters of the discontinuous portions.

METHOD OF MAKING THE FABRIC OF THIS INVENTION AND FURTHER DESCRIPTION OF INVENTION

In the method for making the fabric of this invention, the starting material is a layer of fibrous material whose individual fibers are in mechanical engagement with one another but are capable of movement under applied fluid forces. The layer of fibrous starting material is supported in a fiber rearranging zone in which fiber movement in directions parallel to the plane of said fibrous material is permitted in response to applied fluid forces. Streams of rearranging fluid, preferably water, are then projected into the fibrous layer, in a direction perpendicular to the layer, at entry zones spaced from each other adjacent the entry side of the rearranging zone.

Each stream of rearranging fluid entering an entry zone is passed through the initial part of the rearranging zone, as the fibrous starting material lies in that zone, toward two or more dispersal points lying directly opposite the entry zone and adjacent the exit side of the rearranging zone. In the next step of the method, rearranging fluid is deflected at each such dispersal point diagonally and downwardly, into the area immediately surrounding the dispersal point, away from the perpendicular direction at which the fluid was first projected into the fibrous starting layer.

This deflection of the rearranging fluid moves fiber segments lying opposite an entry zone into the area surrounding a dispersal point opposite that entry zone, and positions some of those fiber segments in yarn-like bundles of closely associated and substantially parallel fiber segments in areas of the fibrous starting material surrounding the entry zone. Other fiber segments moved by the rearranging fluid away from a dispersal point are positioned in similar yarn-like bundles in fiber accumulating zones that lie between adjacent dispersal points and are in registry with an entry zone. The deflected and undeflected portions of the rearranging fluid are then intermingled and passed out of the fiber rearranging zone through spaced exits at the exit side of the rearranging zone.

In one form of the method and apparatus for producing the novel fabrics of this invention, the fibrous starting layer is supported on a foraminous backing means having a plurality of protuberances and troughs alternating across its surface in both the longitudinal and transverse directions, apertured forming means is positioned above the fibrous layer, and streams of rearranging fluid, preferably water, are projected through the apertures of the apertured forming means and against the fibrous starting material. The vertical distance between the tops of the protuberances on the backing means and the bottoms of the immediately adjacent troughs is equal to at least about three times the average diameter of the fibers in the layer of fibrous starting material. Each of the apertures in the apertured forming means is wide enough to span two or more of the protuberances on the backing means.

The resulting novel nonwoven fabric displays a plurality of patterns of yarn-like bundles of fiber segments that alternate and extend throughout the fabric. The first of these is a pattern of yarn-like bundles of fiber segments that have been positioned in the troughs on the surface of the foraminous backing means. These yarn-like bundles at least partially define holes or other areas of low fiber density in discontinuous portions of the fabric. The second pattern is a pattern of yarn-like bundles arranged in accordance with the configuration of the land areas of the apertured forming means. These yarn-like bundles surround the discontinuous portions of the fabric to form a continuous pattern of yarn-like bundles in the fabric.

The basic method and apparatus for producing the fabrics of this invention are shown and described fully in my U.S. Pat. No. 2,862,251, issued Dec. 2, 1958. Full particulars of the basic invention as disclosed in that patent are incorporated in this application by reference, although some of those particulars are repeated here. In addition, the specific features peculiar to the method and apparatus for making the novel plural pattern nonwoven fabrics of the present invention are described in detail in this application.

Starting material.—The starting material used for producing the novel nonwoven fabrics of this invention may be any of the standard fibrous webs such as oriented card webs, isowebs, air-laid webs, or webs formed by liquid deposition. The webs may be formed in a single layer, or by laminating a plurality of the webs together. The fibers in the web may be arranged in a random manner or may be more or less oriented as in a card web. The individual fibers may be relatively straight or slightly bent. The fibers intersect at various angles to one another such that, generally speaking, the adjacent fibers come into contact only at the points where they cross. The fibers are capable of movement under forces applied by fluids such as water, air, etc.

To produce a fabric having the characteristic hand and drape of a textile fabric, the layer of starting material used may comprise natural fibers such as cotton, flax, etc.; mineral fibers such as glass; artificial fibers such as viscose rayon, cellulose acetate, etc.; or synthetic fibers such as the polyamides, the polyesters, the acrylics, the polyolefins, etc., alone or in combination with one another. The fibers used are those commonly considered textile fibers; that is, generally fibers having a length from about ¼ inch to about 2 to 2½ inches. Satisfactory products may be produced in accordance with this invention from starting webs weighing between 80 grains per square yard to 2,000 grains per square yard or higher.

Backing means.—In producing the novel nonwoven fabrics of this invention, the fibrous starting layer is supported on a backing means that is foraminous and is provided with a plurality of protuberances and troughs alternating across its surface in both the longitudinal and transverse directions.

The tops of the protuberances rise above the bottoms of the immediately adjacent troughs by a distance equal to at least about three times but generally no more than about 30 times, the average diameter of the fibers in the layer of fibrous starting material. Preferably, the distance should be equal to about ten times the average diameter of those fibers. The protuberances should not rise so far above their immediately adjacent troughs as to disrupt formation of the pattern of yarn-like bundles of fiber segments corresponding to the land areas of the apertured forming means.

The fibrous starting material used is comprised of closely intertwined and interentangled fibers arranged (depending upon the degree of fiber orientation in the layer) in a more or less helter-skelter fashion. Some of the fibers of the starting material will by random chance lie generally parallel to the troughs of the backing means over which they lie, but the great majority of the fibers will lie at an angle to the longitudinal axis of the trough, and a substantial number of these will lie at angles of 45° or more to that axis.

Now, as already indicated, the fluid rearranging forces of this invention tend to move some fiber segments that are in registry with an aperture of the apertured forming means sidewise until they are no longer in registry with the aperture, to position those segments in yarn-like bundles lying under the land areas of the apertured forming means. At the same time, streams of rearranging fluid move other fiber segments that are in registry with the aperture into closer association and substantial parallelism with each other in yarn-like bundles in the troughs of the backing means. The latter type of fiber movement is more likely to occur with fiber segments in the starting material that lie only a relatively few degrees away from a position parallel to the longitudinal axis of a trough.

In other words, this type of movement is more difficult the greater the angle between a given fiber segment and the axis of the trough, and when fiber segments lie at too great an angle to the longitudinal axis of a trough, they are pushed altogether out of registry with the forming aperture under which they lie so that they are pushed entirely into the surrounding land areas of the apertured forming means. For the greater the angle between the fiber segment and the trough axis, the shorter is the portion of the fiber that bridges the trough, and the more difficult it is for the rearranging fluid forces to get a "purchase" on the fiber segment to turn it around into a position parallel with the trough axis.

Likewise, the narrower the troughs are on the backing means, the more difficult it is for the rearranging fluid forces to get a "purchase" on the short portion of the fiber segment that bridges the trough, to swing that segment around into a position parallel to the axis of the trough to be consolidated there to form a yarn-like bundle with other similarly positioned fiber segments. For this reason, the distance between immediately adjacent protuberances on the backing means, which determines the width of a trough from the top of one side to the other, is ordinarily greater than about 30 times the average diameter of the fibers of the fibrous starting material.

This spacing may be smaller if a vacuum is employed to help rearrange the fibers of the starting material, since the force of the vacuum is then added to the force of the other rearranging fluid employed. With the use of a vacuum assist, the spacing of immediately adjacent protuberances on the backing means is at least about 15 times the average diameter of the fibers of the fibrous starting material.

The minimum spacing of protuberances just mentioned, which affects the width of the troughs lying between immediately adjacent protuberances, also assists in providing good visual resolution between various yarn-like bundles of fiber segments in the fabric resulting from the practice of this invention. For if the protuberances are too closely spaced and the troughs between them are too narrow, yarn-like bundles of fiber segments may be accumulated in the troughs but will not be discernible one from the other, because each one merges into the next adjacent similar bundle of fiber segments.

If the web weight of the fibrous starting material is high, the distance between immediately adjacent protuberances on the backing means should be increased, or otherwise the yarn-like bundles of fiber segments will be masked out by the same merging phenomenon just mentioned. Again, satisfactory visual resolution of immediately adjacent yarn-like bundles of fiber segments can be had with somewhat closer spacing of protuberances if the rearrangement of fibers is assisted by the application of vacuum.

Apertured forming means.—The fluid entry zones into the fiber rearranging zone as described previously are defined by an apertured forming means that is solid throughout its areas except for the forming apertures disposed longitudinally and transversely across the member. The forming apertures must be substantially larger in area than the openings in the foraminous backing means. The forming apertures may have any desired shape, i.e., round, square, diamond, oblong, free form, etc.

The land areas of the apertured forming means that lie between and interconnect the forming apertures may be either narrow or broad in comparison to the forming apertures as desired. Generally speaking, the narrower the width of the land areas, the more tightly compacted will be the yarn-like bundles of closely associated and substantially parallel fiber segments that are formed under those land areas in the nonwoven fabric of this invention.

For the clearest visual resolution between bundles of fiber segments in the nonwoven fabrics of this invention, each aperture of the apertured forming means should span a plurality of the protuberances on the backing means. For still better results, each aperture in the apertured forming means should span a plurality of protuberances on the backing means measured in both the longitudinal and transverse directions, with the land area defining the forming aperture lying generally above a trough in the foraminous backing means.

During the use of the method or apparatus, the apertured forming means and the foraminous backing means are spaced from each other to provide a fiber rearranging zone in which fiber movement in directions parallel to the backing means is permitted in response to applied fluid forces.

Rearranging fluid.—The rearranging fluid for use with this invention is preferably water or a similar liquid. It may also be other fluids such as a gas, as described in my Pat. No. 2,862,251.

BRIEF DESCRIPTION OF THE DRAWINGS

The invention will be more fully described in conjunction with the accompanying drawings wherein.

DETAILED DESCRIPTION OF SPECIFIC EMBODIMENTS OF THIS INVENTION

Figure 1:
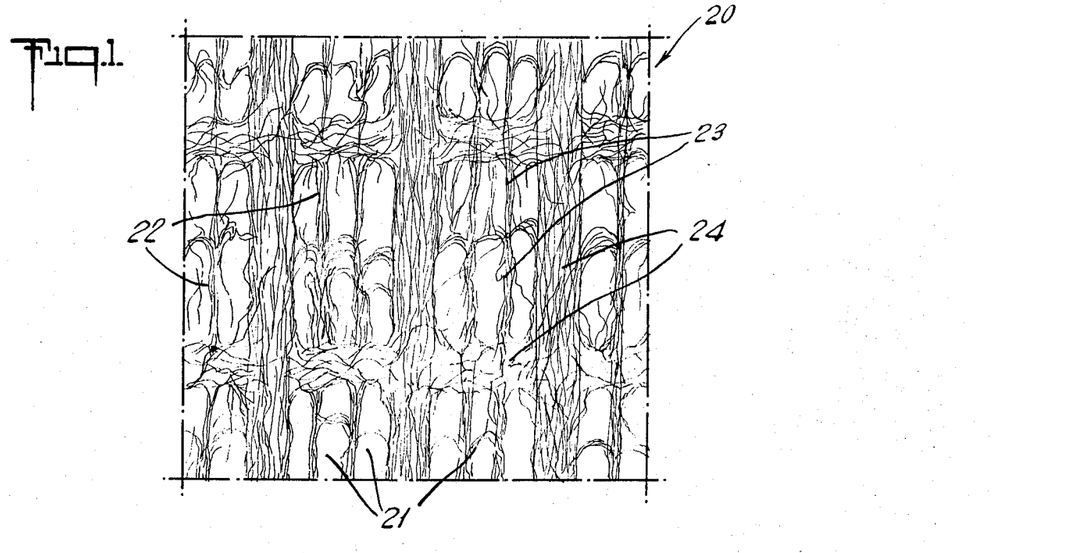
FIG. 1 is a schematic drawing of a fabric in accordance with the present invention.

Referring to the figures, FIG. 1, there is shown a nonwoven fabric 20 of the present invention. The fabric comprises a first regular or predetermined pattern of areas of low fiber density 21. These areas are disposed in discontinuous portions of the fabric. Each of the areas of low fiber density is at least partially defined by a plurality of yarn-like bundles 22 of fiber segments. The segments in the bundles are closely associated with other segments in the bundle. These yarn-like bundles are interconnected at junctures 23 by groups of fibers common to a plurality of bundles. Each of these discontinuous portions of the fabric is bounded around its perimeter by a regular or predetermined pattern of yarn-like bundles 24 extending continuously throughout the fabric. These yarn-like bundles 24 are heavier in weight than the first mentioned yarn-like bundles 22. The discontinuous portions of the fabric are substantially rectangular in shape and are uniformly spaced in rows extending longitudinally and transversely of the fabric.

Figure 2:
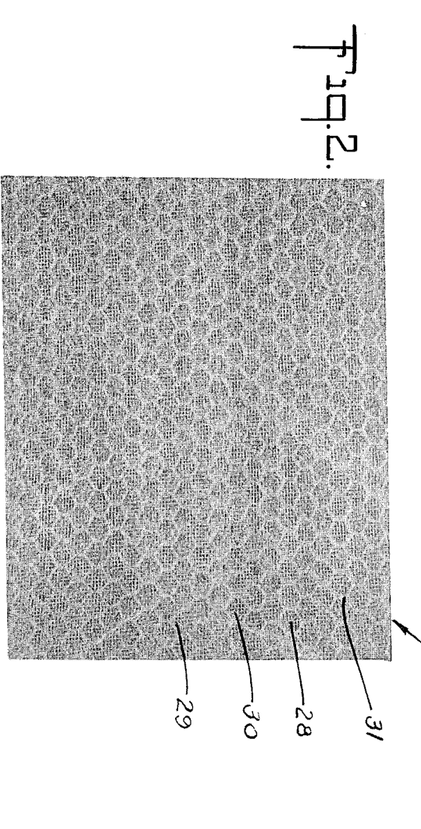
FIG. 2 is a photograph of a fabric of the present invention, shown in the original photograph at actual size.

In the photograph in FIG. 2 there is shown another fabric 27 of the present invention. In this fabric, the discontinuous portions 28 of the fabric are hexagonal in shape and are staggered in one direction and aligned in rows in the other direction. The discontinuous portions comprise a plurality of areas of low fiber density 29 some of which areas are fully defined by yarn-like bundles 30 of fiber segments and other areas partially defined by such bundles of yarn-like fiber segments. All of the areas 29 are bounded around their perimeter by a continuous pattern of heavier yarn-like bundles 31 of fiber segments. These heavier bundles are arranged in a hexagonal configuration.

Figure 3:
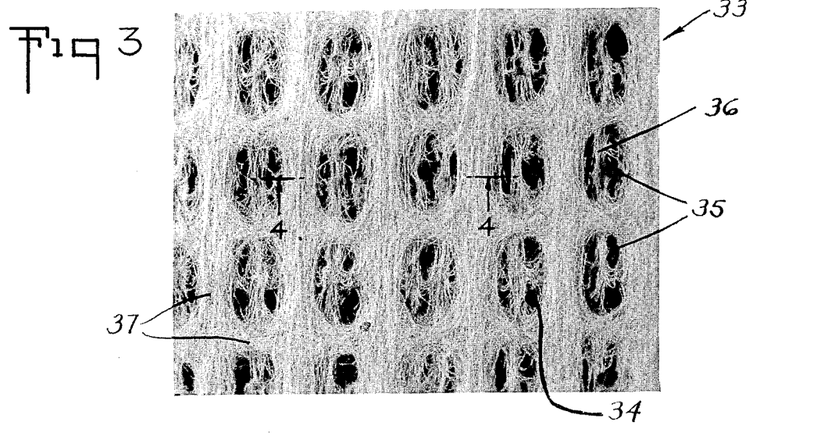
FIG. 3 is a photomicrograph of another type of fabric of the present invention at an original enlargement of 5 times.
Figure 4:
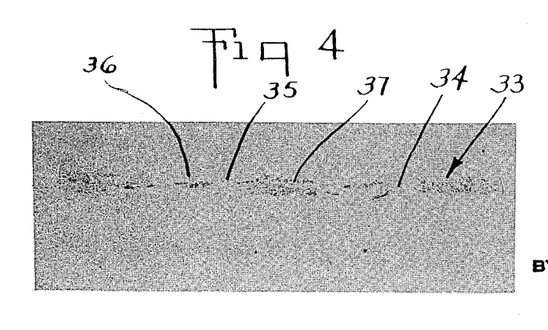
FIG. 4 is a photomicrograph of a cross-sectional view taken along a line similar to that shown as line 4—4 in FIG. 3 at an original enlargement of 10 times.

Referring to the photomicrograph in FIGS. 3 and 4, there is shown yet another fabric 33 of the present invention. In this fabric the discontinuous portions 34 of the fabric have an oval shape and are aligned both transversely and longitudinally of the fabric. These discontinuous portions have areas of low fiber density 35 which are at least partially defined by yarn-like bundles 36 of fiber segments. These discontinuous portions are bounded around their perimeter by a continuous pattern of heavier yarn-like bundles 37 of fiber segments. These heavier bundles extend transversely and longitudinally of the fabric. The difference in weight of these yarn-like bundles can be readily seen in the cross-sectional photomicrograph, FIG. 4.

Figure 5:
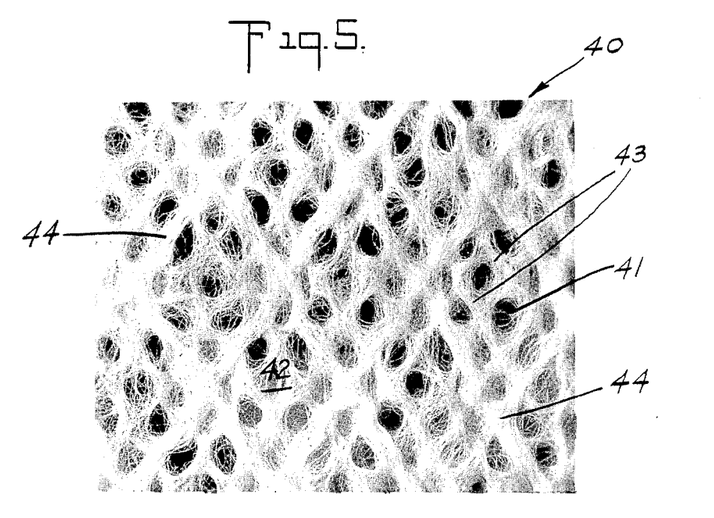
FIG. 5 is a photomicrograph of another embodiment of the fabric of the present invention at an original enlargement of 5 times.
Figure 6:
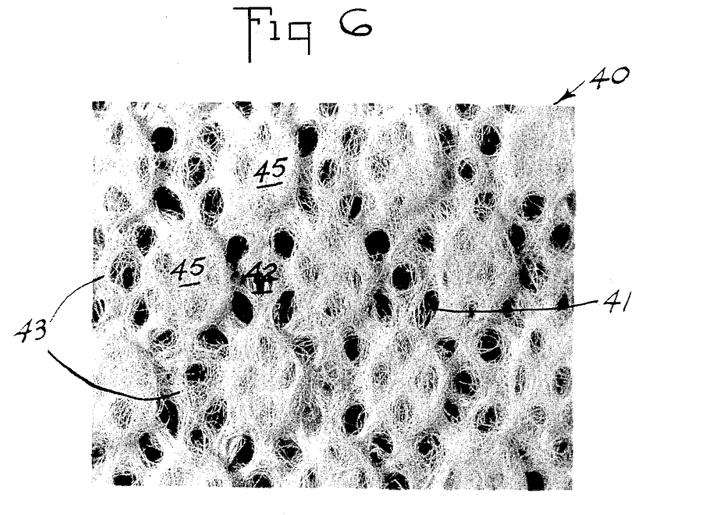
FIG. 6 is a photomicrograph of the opposite surface of the fabric of FIG. 5 at an original enlargement of 5 times.

Referring to FIGS. 5 and 6 of the drawings, there is shown another embodiment of the novel fabric of the present invention; FIG. 5 showing one surface hereinafter referred to as the bottom surface and FIG. 6 showing the opposite surface of the same fabric and hereinafter referred to as the top surface. The fabric 40 as seen in FIG. 5 comprises a first regular or predetermined pattern of areas of low fiber density 41. The areas are located in discontinuous portions 42 of the fabric. The portions 42 are diamond shaped. Each area of low fiber density 41 is at least partially defined by yarn-like bundles 43 of fiber segments. The diamond shaped portions are bound around their perimeter by a continuous pattern of yarn-like bundles 44 of fiber segments. The continuous pattern extends in crossing diagonals over the surface of the fabric. However, because of the manner in which this fabric is made and the weight of the starting fibrous material, the opposite surface or top surface of the fabric as seen in FIG. 6, also shows a somewhat heavier deposition of fibers at each point 45 where the diagonally disposed yarn-like bundles 44 cross each other. This heavier deposition of fiber gives the fabric a three-dimensional appearance and somewhat obscures the basic pattern of the fabric when the fabric is viewed from the top surface.

Description of machine and method for making fabrics of my invention

Figure 7:
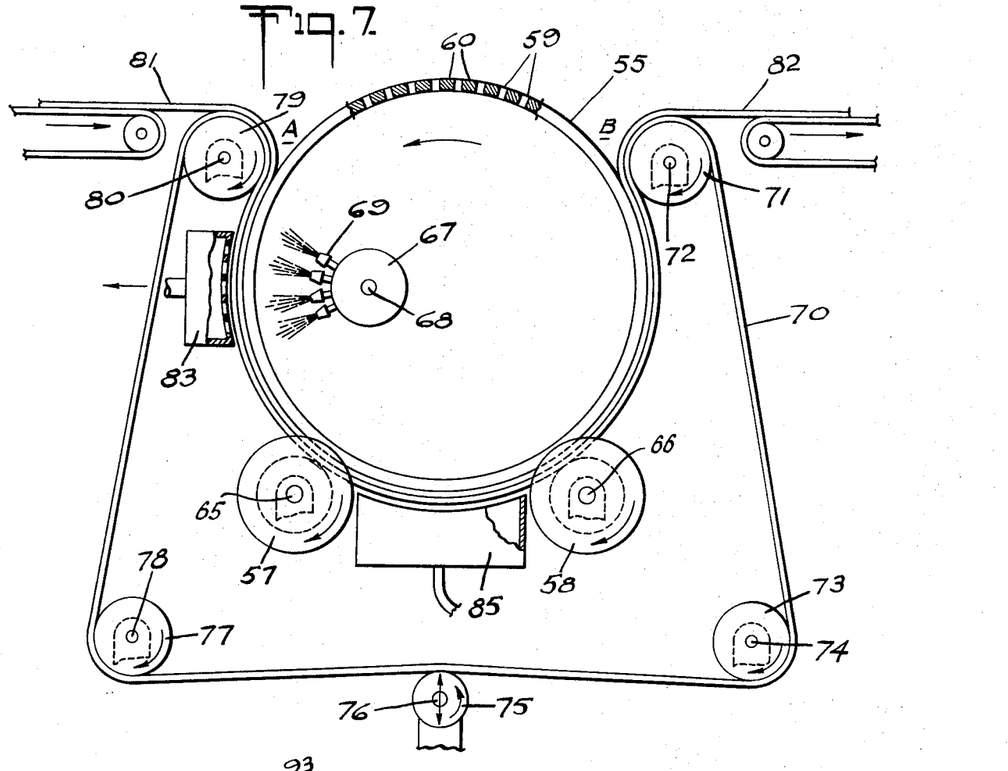
FIG. 7 is a diagrammatic showing in elevation of one type of apparatus for carrying out the method for producing the fabrics of the present invention.

FIG. 7 shows one form of apparatus that may be used to produce the novel nonwoven fabric of the present invention. Full particulars of this apparatus, including methods of mounting, rotation, etc., are more fully described in my U.S. Pat. No. 2,862,251, issued Dec. 12, 1958, and are incorporated in the present application by reference and thus need not be described in complete detail here. In view of this reference, the apparatus of FIG. 7 will be described in general terms insofar as its essential elements are the same as in the patent just mentioned, and the feature used to manufacture the novel nonwoven fabrics of the present invention, i.e., the backing means and its relationship to the apertured forming means, will be described in more detail.

The apparatus of FIG. 7 includes a rotatable apertured drum 55 suitably mounted on flanged guide wheels 57 and 58. The drum has apertures 59 uniformly spaced over its entire surface, with the remaining portions of the drum constituting land areas 60. The guide wheels are mounted for rotation on shafts 65 and 66.

Inside the drum, a stationary manifold 67 to which a fluid is supplied through conduit 68 extends along the full width of the drum. On one side of the manifold is a series of nozzles 69 directing the fluid against the inside surface of the drum.

Figure 10:
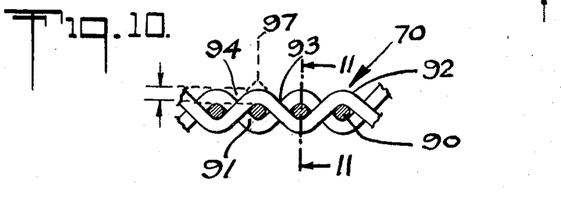
FIG. 10 is a cross-sectional view taken along line 10—10 of FIG. 9.
Figure 11:
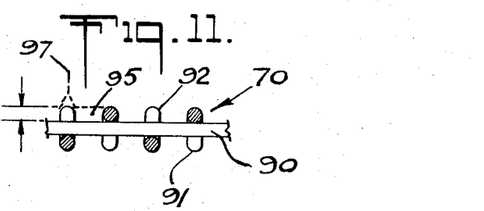
FIG. 11 is a cross-sectional view taken along the line 11—11 of FIGS. 9 and 10.

About the greater portion of the periphery of the drum there is positioned a novel backing or support member 70. (The terms backing member and support member are used interchangeably throughout this description.) Support member 70, as shown in FIGS. 9 through 11, is formed of a coarse woven screen, preferably metal.

Figure 9:
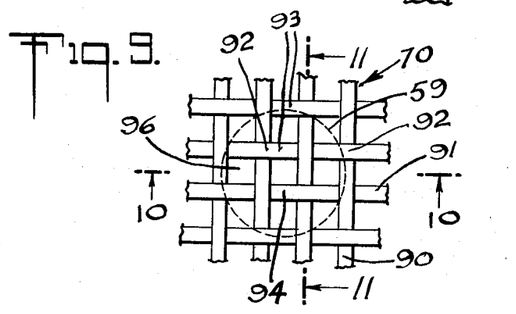
FIG. 9 is an enlarged fragmentary diagrammatic plan view of a portion of a backing means that can be used in the apparatus of FIG. 7, an aperture of the apertured forming means being shown in dashed lines.

In the embodiment shown, wires 90 running vertically in FIG. 9 are straight, while wires 91 running horizontally in that figure weave alternately over and under wires 90. Protuberances 92 are present throughout foraminous portion 70 as the topmost part of each "knee" of a given strand 91 of the screen that is formed as the strand weaves over and under the strands 90 that lie perpendicular to it.

As a given strand 91 slants downward to pass under a strand 90 perpendicular to it, it crosses two other strands 91 disposed on either side of it, as those strands slant upward to pass over the same perpendicular strand that the given strand will pass under. Each series of such "crossing points" 93 forms a trough, such as trough 94 in FIGS. 9 and 10, that lies between adjacent protuberances 92. The effective shape of troughs 94, as can be best seen in FIG. 10 (which shows a cross section of element 70 of which a plan view is given in FIG. 9), is substantially an inverted triangle.

A series of slightly deeper troughs 95 is formed between adjacent protuberances 92 but extends at right angles to troughs 94. As best seen in FIG. 11, the bottom of each trough 95 is formed by portions of straight strands 90, with successive protuberances 92 on each side of the trough forming the tops of the trough. As seen in FIG. 11, the effective shape of troughs 95 may be characterized as a shallow U-shape.

As shown in FIG. 9, a plurality of troughs 94 and a plurality of protuberances 92 alternate in one direction across the surface of foraminous backing means 70. FIG. 9 also shows that a plurality of troughs 95 and a plurality of protuberances 92 alternate in a direction perpendicular to troughs 94. Hence, a plurality of troughs and a plurality of protuberances alternate in both the longitudinal and transverse directions across the surface of foraminous backing means 70.

To produce satisfactory rearrangement of fibers into yarn-like bundles of closely associated and substantially parellel fiber segments positioned in troughs 94 and in troughs 95, the vertical distance between the tops of protuberances 92 and the bottoms of the immediately adjacent troughs should be at least about three times, generally no more than about 30 times, and preferably about ten times, the average diameter of the fibers in the layer of fibrous starting material. For troughs 94, this distance is the vertical distance indicated in FIG. 10 by the pair of dashed lines that pass, respectively, through the tops of protuberances 92 and the crossing points 93 that define the troughs. The vertical distance from the bottom of each trough 95 to the tops of protuberances 92, on the other hand, is somewhat larger, being shown by FIGS. 10 and 11 to be equal to the diameter of a strand 91.

In the apparatus of FIG. 7, support member 70 passes about drum 55 and separates from the drum at guide roll 71, which rotates on shaft 72. The support member passes downwardly around guide roll 73, rotating on shaft 74, and then rearwardly over a vertically adjustable tensioning and tracking guide roll 75 rotating on shaft 76, and then around guide roll 77 on shaft 78. The member passes upwardly and around guide roll 79 rotating on shaft 80, to be returned about the periphery of the drum.

Apertured forming drum 55 and backing belt 70 provide a rearranging zone between them through which a fibrous starting material may move, to be rearranged under the influence of applied fluid forces into a nonwoven fabric having a plurality of patterns of yarn-like bundles of fiber segments that alternate and extend throughout its area.

Tension on the support member is controlled and adjusted by the tensioning and tracking guide roll. The guide rolls are positioned in slideable brackets which are adjustable to assist in the maintenance of the proper tension of the support member. The tension required will depend upon the weight of the fibrous web being treated and the amount of rearrangement and patterning desired in the final product.

Apertured drum 55 rotates in the direction of the arrow shown, and support member 70 moves in the same direction at the same peripheral linear speed and within the indicated guide channels, so that both longitudinal and lateral translatory motion of the backing means, the apertured forming means, and the fibrous layer with respect to each other are avoided. The fibrous material 81 to be treated is fed between the drum and support member at point "A," passed through a fiber rearranging zone where fluid rearranging forces are applied to it, and is moved in its new, rearranged form as nonwoven fabric 82 between the support member and apertured drum at point "B."

As fibrous material 81 passes through the fiber rearranging zone, a liquid such as water is directed against the inner surfaces of rotatable apertured drum 55 by nozzles 69 mounted inside the drum, the liquid passes through apertures 59 into the fibrous web to produce rearrangement of the fibers of the web, and the water thence passes out through the backing means.

If desired, vacuum assist box 83 is located against the outside surface of the backing means 70. Vacuum box 83 has a slotted surface located closely adjacent the outer surface of belt 70, and through which suction is caused to act upon the web. Suction thus applied assists in the rearrangement of the fibers as the web material passes through the rearranging zone. In addition, it serves to help de-water the web and prevent flooding during fiber rearrangement. Vacuum box 85 located below drum 55 also helps de-water the web after it is rearranged.

The relative position of a forming aperture 59 and protuberances 92 of backing means 70 in one form of the method and apparatus of this invention is shown in dashed lines in FIG. 9. As is seen, aperture 59 spans a plurality of protuberances 92 on foraminous member 70 in both the longitudinal and transverse directions. In the embodiment shown, each of the two protuberances 92 in registry with apertures 59—having a directional effect in one direction because of its proximity to other similar protuberances on backing means 70, and in the other direction for the same reason and in addition because of the cross-sectional shape of the protuberance—is effective in both the longitudinal and transverse directions.

Protuberance 92 opposite the ten o'clock position of aperture 59 in FIG. 9, through cooperation with protuberance 92 lying just below the seven o'clock position of aperture 59 in that same figure, is effective as a protuberance that defines one wall of trough 94 running vertically down the middle of aperture 59. At the same time, the first named protuberance 92, through cooperation with protuberances 92 lying just outside the two o'clock position of aperture 59 in FIG. 9, is effective as a protuberance that defines one wall of trough 95 running horizontally across the middle of aperture 59. In addition, the cross sectional shape of each protuberance 92 (as best seen in FIGS. 9 and 11) exerts a directional effect on the fibers of the fibrous starting material by its sharper definition of the side walls of each trough extending horizontally across FIG. 9, i.e., on the side walls of each trough 95.

The directions the streams of rearranging fluid projected through apertures 59 of apertured forming means 55 take as they move into and through the fibrous web determine the type of forces applied to the fibers and, in turn, the extent of rearrangement of the fibers. Since the directions the stream of rearranging fluid take after they pass through apertures 59 are determined by the pattern of the solid wires that make up backing means 70, and in particular, the pattern of protuberances and troughs distributed across the surface of means 70, it follows that the pattern of these areas helps determine the patterns of holes or other areas of low fiber density in the resultant fabric.

As is seen from FIG. 9, portions of the streams of rearranging fluid that have passed through forming apertures 59 and the fibrous web can pass directly through openings 96 in foraminous backing means 70. Other portions of the streams of rearranging fluid that have passed through apertures 59 strike the wires of woven screen 70, at protuberances 92 or at other portions of the wire, and are deflected sidewise before they pass out of the rearranging zone through openings 96. The streams of rearranging fluid that strike protuberance 92 opposite the upper left hand portion of aperture 59 in FIG. 9, for example, leave the fiber rearranging zone through openings 96, in the respective sectors or quadrants of the area surrounding the protuberance.

The dotted lines in FIGS. 10 and 11 give a schematic showing of the path followed by a stream of rearranging fluid 97 that is directed through aperture 59 into the layer of fibrous starting material in a direction perpendicular to that layer, to strike protuberance 92 in the ten o'clock position of aperture 59 in FIG. 9. As is seen, the stream of fluid is deflected downwardly and outwardly away from its perpendicular direction of entry into the fiber rearranging zone, and then moves out of the rearranging zone through openings between wires 90 and 91.

The flow of streams of rearranging fluid through adjacent apertures 59 of apertured forming means 55 produces a set of counteracting components of force which act in the plane of the web until the fluid is able to pass out through the support member. These fluid forces work in conjunction with one another to rearrange fiber segments into interconnected bundles, packing the fiber segments into yarn-like bundles that lie beneath land areas 60 of apertured forming means 55.

The flow of other streams of rearranging fluid after being deflected sidewise upon striking protuberances 92 of backing means 70 produces a second set of counteracting components of force that act in the plane of the web, but frequently in the opposite direction to the first set of counteracting components of force just described. The counteracting fluid forces in this second set work in conjunction with one another to rearrange fiber segments into yarn-like bundles positioned in troughs 94 and 95 of backing means.

Surprisingly, these two different sets of counteracting components of force work in cooperation with each other to produce excellent nonwoven fabrics. When backing means 70 and apertured forming means 55 are employed in the method or apparatus of this invention as shown in FIG. 9, some of the fiber segments in registry with apertures 59 of apertured forming means 55 are moved by streams of rearranging fluid into surrounding areas of the fibrous layer and are there positioned in a first pattern of yarn-like bundles of closely associated and substantially parallel fiber segments that is complementary to apertures 59. At the same time, a second pattern of yarn-like bundles of fiber segments is created within the first pattern, being formed of yarn-like bundles that are positioned in troughs 94 and 95 on backing means 70 when other fiber segments that are in registry with apertures 59 of forming means 55 are moved by the fluid rearranging forces into the troughs.

When the layer of fibrous starting material is first positioned in the fiber rearranging zone between apertured forming means 55 and foraminous backing means 70, before a rearranging fluid has been directed through apertures 59 of forming means 55, the fibrous web of course lies upon the tops of protuberances 92. After fiber rearrangement has proceeded under the impact of rearranging fluid introduced through apertures 59, the fibers are moved down the sloping sides of protuberances 92 into troughs 94 and 95. At this juncture, the layer of rearranged fibers that comprises the nonwoven fabric ordinarily lies largely, if not altogether, below the tops of protuberances 92.

Figure 12:
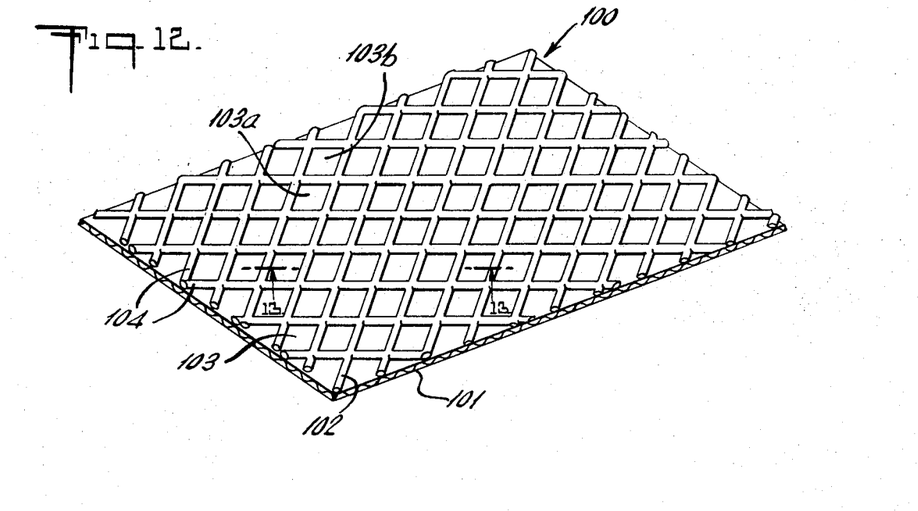
FIG. 12 is a perspective view of a portion of another type of backing means that can be used in the apparatus of FIG. 7 to produce fabrics similar to those shown in FIGS. 5 and 6.
Figure 13:
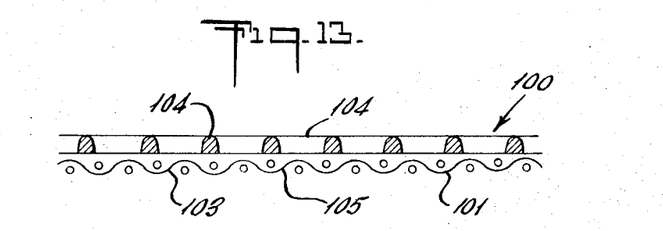
FIGS. 13 is a cross-sectional view taken along the line 13—13 of FIG. 12.

Referring to FIGS. 12 and 13, there is shown another type of backing means which may be used in the apparatus depicted in FIG. 7 to produce the novel nonwoven fabrics of the present invention. The backing means 100 comprises a woven wire screen 101 having a relatively smooth surface as compared to the screen described in conjunction with FIGS. 9 through 11. On top of the screen, i.e., on the side adjacent the forming means 55, is a net-like material 102 having diamond shaped openings 103 formed by solid strands 104 running diagonally to each other. As seen in the drawings, the solid strands 104 extend above the surface of the wire screen 101. The apertures 59 in the forming member 55 are smaller than the openings 103 in the net-like material but larger than the openings 105 in the wire screen 101. The width of the strands 104 is substantially the same size as the width of an aperture 59 in the forming means 55.

The direction the streams of rearranging fluid projected through apertures 59 of forming means 55 take as they move into and through the fibrous web, determine the type of forces applied to the fibers and the pattern of rearrangement of the fibers.

Utilizing the backing means shown in FIGS. 12 and 13, the fiber segments tend to be washed off the top of the solid strands 104 and accumulate in the opening 103. At the same time, the fiber segments in the opening 103 are rearranged into areas of low fiber density which are defined by yarn-like bundles of fiber segments. Simultaneously, the rearranging forces produce a pattern of yarn-like bundles which extend from the center of one opening such as 103a to the center of the diagonally adjacent opening such as 103b to form a fabric similar to that depicted in FIGS. 5 and 6.

The rearranged web or fabric of this invention may be treated with an adhesive, dye, or other impregnating, printing, or coating material in a conventional manner. For example, to strengthen the rearranged web, any suitable adhesive bonding materials or binders may be included in an aqueous or non-aqueous medium employed as the rearranging fluid. Or an adhesive binder may, if desired, be printed on the rearranged web to provide the necessary fabric strength. Thermoplastic binders may, if desired, be applied to the rearranged web prior, during or after rearrangement in powder or other form and then fused to bond the fibers.

The optimum binder content for a given fabric according to this invention depends upon a number of factors, including the nature of the binder material, the size and shape of the binder members and their arrangement in the fabric, the nature and length of the fibers, total fiber weight, and the like. In some instances, because of the strength of the fibers used or the tightness of their interentanglement in the rearranged web or fabric, no binder at all need be employed to provide a usable fabric.

Further details and descriptions of methods and apparatus which may be used to produce the novel nonwoven fabrics of the present invention are given in my commonly assigned patent applications entitled Method and Apparatus For Producing Nonwoven Fabrics Having a Plurality of Patterns (Ser. No. 22,303 filed Mar. 24, 1970 and now abandoned) and Method and Apparatus For Producing Nonwoven Fabrics Having a Plurality of Patterns (Ser. No. 22,309 filed Mar. 24, 1970 and now abandoned) filed concurrently with the present patent application. It is to be noted that not all embodiments of the apparatus disclosed in the above-mentioned patent applications will necessarily produce the novel nonwoven fabrics of the present invention.

The following are illustrative examples of method and apparatus used to produce the novel patterned nonwoven fabrics of the present invention.

EXAMPLE 1

In apparatus as illustrated in FIG. 7, a web 81 of loosely assembled fibers, such as may be obtained by carding, is fed between apertured forming means 55 and backing means 70. The web weight is about 450 grains per square yard, and its fiber orientation ratio approximately 7 to 1 in the direction of travel. The web contains viscose rayon fibers approximately 1 9/16" long of 1 1/2 denier.

Apertured forming means 55 has about 30 round apertures per square inch, each having a diameter of about 1/8". These apertures 59 are arranged in a rectangular pattern over forming means 70, with each aperture spaced approximately 0.075" from adjacent apertures in the longitudinal direction and approximately 0.040" from adjacent apertures in the transverse direction.

Backing means 70 comprises a coarse woven wire screen similar to that shown in FIGS. 9 through 11. The screen is approximately 14 x 18 mesh or substantially 252 openings per square inch. The vertical distance between the tops of protuberances 92 and troughs 94 such as shown in FIGS. 9 and 10 is approximately 0.005", or in other words, a little more than three times the 0.0015" average diameter of the 112 denier fibers making up the starting material. The same vertical distance for troughs 95 such as those shown in FIG. 11 is slightly larger.

The horizontal distance between the tops of protuberances 92 is about 0.056" in one direction and about 0.071" in the other. These distances are equal, respectively, to about 37 times and about 47 times the 0.0015" average diameter of the fibers of the fibrous starting material.

Each aperture 59 spans a plurality of protuberances 92 on backing screen 70, measured in both the longitudinal and transverse direction. Apertured forming means 55 and permeable backing means 70 are spaced from each other during use of the apparatus of FIG. 7 to provide a fiber rearranging zone therebetween.

Water is projected from nozzle 69 through apertures 59 in apertured forming means 55, and sent through fibrous web 81 and backing means 70.

After a given portion of fibrous web 81 passes through the rearranging zone, in which streams of water are directed against it as just described, the rotation (in the counterclockwise direction as seen in FIG. 7) of the sandwich comprised of apertured drum 55, the rearranged nonwoven fabric 82, and backing means 70 brings the rearranged fabric over vacuum drying means 85, which helps to remove the water remaining in the fabric. Fabric 82 is then carried forward to take-off zone "B," where it leaves the apparatus.

With the conditions indicated, good fiber rearrangement and bundling are obtained, and an excellent nonwoven fabric such as shown in the photomicrograph of FIG. 3, which has a plurality of patterns of yarn-like bundles of fiber segments each extending throughout the fabric, is produced.

Nonwoven fabric 33 of FIG. 3 contains larger areas of low fiber density 34, each of which has a shape generally similar to apertures 59 and is defined by heavy yarn-like bundles 37 of closely associated and substantially parallel fiber segments. Yarn-like bundles 37 are arranged in accordance with the configuration of land areas 60 of apertured forming means 55, or in other words, in a first pattern complementary to forming apertures 59 of forming means 55. Each yarn-like bundle 37 is connected with other such bundles to form a continuous line or lines that may be traced throughout the nonwoven fabric 33.

In addition, nonwoven fabric 33 contains smaller areas of low fiber density 35, arranged in accordance with the pattern of arrangement of protuberances 92 on permeable backing means 70. As indicated, areas of low fiber density 35 are smaller than areas 34, and lie within these areas. Each of the areas 35 is defined by yarn-like bundles 36 of closely associated and substantially parallel fiber segments, which have been positioned by the fluid rearranging forces of this invention in troughs 94 and 95 of backing means 70, and thus form a second pattern corresponding to the pattern of those troughs. Those bundles 36 are lighter in weight than are yarn-like bundles 37, which define larger areas of low fiber density 34.

Yarn-like bundles 36 are connected with each other and with yarn-like bundles 37 at junctures by groups of fibers common to a plurality of bundles, the fibers at such junctures being oriented in a plurality of diverse directions.

FIG. 4 gives a cross sectional view of the fabric of FIG. 3 taken along a line similar to that shown as line 4—4 in FIG. 3, and with an original enlargement twice as large as that of FIG. 3. Larger areas of low fiber density 34 and smaller areas of low fiber density 35 may be seen in cross section. The first pattern of yarn-like bundles of fiber segments 37 that define areas 34, and the second pattern of yarn-like bundles of fiber segments that define areas 35 can also be seen.

EXAMPLE 2

FIG. 2 gives a photomicrograph of another nonwoven fabric made in accordance with the present invention.

The starting material is a web similar to the starting material of Example 1, except that it has a web weight of approximately 350 grains per square yard.

Figure 8:
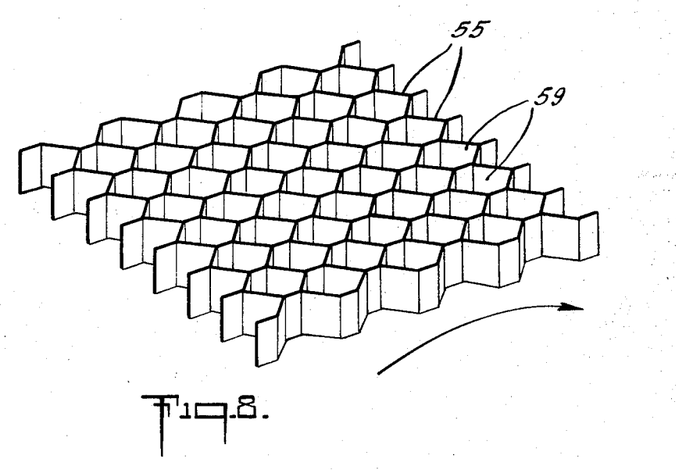
FIG. 8 gives a perspective view of a portion of an apertured forming means that can be used with the apparatus of FIG. 7 to produce the fabrics of the present invention.

Apertured forming means 55 used in this example is a cylinder formed of metal strips arranged in a "honeycomb" pattern of contiguous hexagonal openings 59. The distance between parallel opposite sides of each hexagonal shaped forming aperture 59 is about 7/16". The metal strips comprising the honeycomb structure are approximately 0.040" in thickness and about 3/4" in depth. A perspective drawing of a portion of such a metallic honeycomb structure is provided in FIG. 8.

Backing means 70 comprises a coarse woven wire screen 70 having alternating protuberances 92 and troughs 94 and 95 similar to that used in Example 1. One pair of parallel, opposite sides of each hexagonal shaped forming aperture lie generally above the fiber accumulating troughs on the backing means.

Using the same general mode of operation as in Example 1, an excellent nonwoven fabric of attractive appearance such as is shown in the photomicrograph of FIG. 2 is obtained.

Nonwoven fabric 27 of FIG. 2 contains areas of low fiber density 28, each of which has the general hexagonal shape of forming apertures 59, and is defined by yarn-like bundles 31 of closely associated and substantially parallel fiber segments. These bundles are accumulated, by application of the fluid rearranging forces, under the land areas of the honeycomb apertured forming means 55, and are arranged in a first pattern complementary to the pattern of forming apertures 59, i.e., in interconnected hexagonal patterns. Each yarn-like bundle 31 is connected with other such bundles to form a continuous line or lines that may be traced throughout nonwoven fabric 27.

In addition, nonwoven fabric 27 contains areas of low fiber density 29 that are arranged in accordance with the pattern of arrangement of protuberances on backing means 70. Each of these areas of low fiber density 29 is defined by yarn-like bundles of fiber segments 30, which are bundled and positioned by the fluid rearranging forces in a second pattern corresponding to the pattern of troughs 94 and 95 of backing means 70. As is seen, areas of low fiber density 29 defined by the second pattern of yarn-like bundles 30 are smaller than and lie within areas of low fiber density 28 defined by the first pattern of yarn-like bundles 31.

Yarn-like bundles 30 are connected with each other and with yarn-like bundles 31 at junctures by groups of fibers common to a plurality of bundles, the fibers at such junctures being oriented in a plurality of diverse directions.

EXAMPLE 3

In this example, a web similar to that employed in Example 1 is positioned between apertured forming means and backing means, while water is projected through the apertures of the forming means to pass through the fibrous web and then the backing means. Vacuum is applied to the backing means of the side of that means that is opposite the fiber rearranging zone, to assist in fiber rearrangement.

The apertured forming means employed is a nylon knitted mesh known as a raschel knit fabric, with oval openings approximately 1/16" by 1/8". The oval openings are distributed over the area of the apertured forming means in a diamond pattern, with a space of approximately 1/16" between them measured in the diagonal direction. There are 24 openings per square inch.

The backing means used in this example comprises a woven nylon screen of approximately 28 x 34 mesh, or substantially 952 openings per square inch. The vertical distance between the top of the protuberances formed by the "knees" of the woven screen and the bottom of the troughs lying between the protuberances is about 0.007".

The tops of the protuberances on the backing means are spaced approximately 0.029" in one direction and approximately 0.036" in the other. This is equivalent, respectively, to about 20 times and about 24 times the average diameter of the fibers of the fibrous starting material.

The use of vacuum assist in this example results in a plurality of discontinuous, oval shaped fiber rearranging zones spaced from each other, with a continuous interconnecting zone between those discontinuous zones in which the apertured forming means and backing means, under the influence of the applied vacuum assist, clamp the fibrous starting material so tightly that the fluid rearranging forces are not capable of effecting fiber rearrangement in that zone. These areas in which fiber rearrangement is prevented, underlie the land areas of the apertured forming means.

Figure 14:
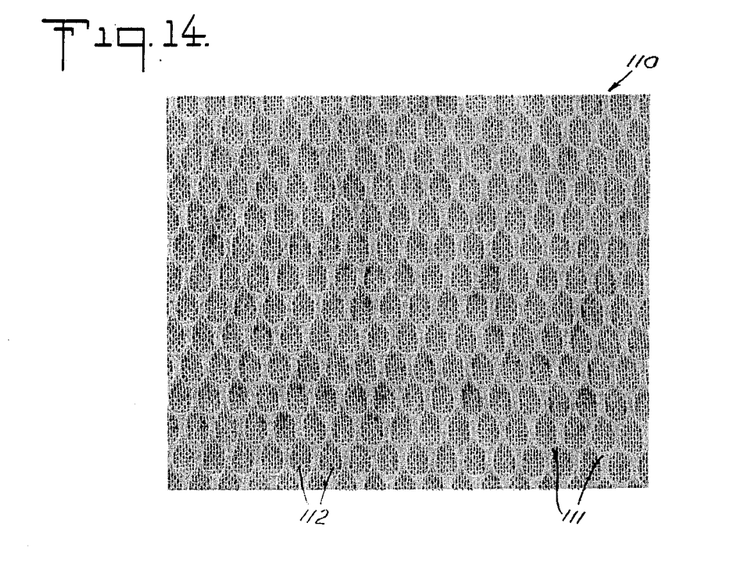
FIG. 14 is a photograph of another embodiment of the fabric of the present invention.
Figure 15:
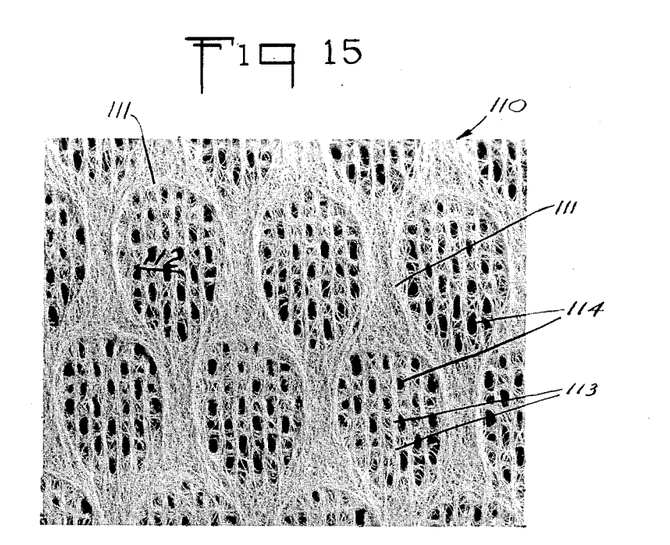
FIG. 15 is a photomicrograph of the fabric of FIG. 14 at an original enlargement of 5 times.

Using the method and apparatus indicated, an attractive nonwoven fabric 110 such as is shown in the photograph, FIG. 14 and the photomicrograph, FIG. 15, is obtained. As is seen, a first pattern of heavier yarn-like bundles 111 of fiber segments is positioned, with some of the yarn-like bundles 111 extending in the longitudinal direction and some in the transverse direction, around the entire perimeter of each of the oval shaped areas 112 of the resulting fabric that corresponds to an aperture of the apertured forming means.

Within each oval area 112 in the fabric, as seen in FIG. 15, a second pattern of yarn-like bundles 113 of fiber segments having a lighter weight are positioned in both the longitudinal and transverse directions, in accordance with the pattern of the troughs on the backing means. The second pattern of yarn-like bundles 113 define a plurality of holes 114 or areas of low fiber density.

Yarn-like bundles 111 are interconnected with yarn-like bundles 113, and the latter are connected with each other at junctures by fibers common to a plurality of bundles, the fibers at said junctures being oriented in a plurality of diverse directions.

EXAMPLE 4

In apparatus as illustrated in FIG. 7, a web 81 of loosely assembled fibers, such as may be obtained by carding, is fed between apertured forming means 55 and backing means 70. The web weight is about 400 grains per square yard, and its fiber orientation ratio approximately 7 to 1 in the direction of travel. The web contains viscose rayon fibers approximately 1 9/16" long, of 1½ denier.

The apertured forming means 55 used in this example has about 165 substantially round holes per square inch, each approximately .045" in diameter or about 30 times the average diameter of the fibers of the fibrous starting material. The holes are arranged in a diamond pattern over the forming means. Each aperture 59 is spaced approximately .040" from the diagonally adjacent aperture on the drum.

The backing means used in this example is similar to that depicted in FIGS. 12 and 13. The discontinuous foraminous portions of backing means 100 are comprised of a woven nylon screen of approximately 28 x 34 mesh or substantially 952 openings per square inch. Each foraminous portion is oval or diamond in shape, measuring approximately 1/16" in one direction and approximately 1/8" in the other, and is spaced about 1/8" from the immediately adjacent foraminous portions. Foraminous portions 103 are distributed in a diamond pattern, 24 to the square inch, over backing means 100.

Continuous imperforate portions 104 of backing means 100 comprise a nylon knitted mesh knowns as raschel knit fabric, of the form shown in plan view in FIG. 12 and in cross section in FIG. 13. The width of each imperforate portion 104 at its narrowest part is approximately 1/16" or about 0.063", which is about one-and-a-half times the diameter of each aperture 59 of apertured forming means 55. Together, the grid of imperforate portions defines foraminous portions 103. The height of each imperforate portion 104 is approximately 1/32" at its rounded top portion.

With the conditions indicated, good fiber rearrangement and bundling are obtained. An excellent nonwoven fabric such as shown in the photomicrograph of FIGS. 5 and 6 which has a plurality of intersecting patterns that alternate and extend throughout the fabric, is produced.

Nonwoven fabric 40 of FIGS. 5 and 6 contains areas of low fiber density 41. Each area 41 is at least partially defined by yarn-like bundles 43 of fiber segments. These areas of low fiber density 41 and yarn-like bundles 43 are located in discontinuous portions 42 of the fabric and each portion 42 is bound by a pattern of yarn-like bundles 44 of closely associated and substantially parallel fiber segments.

Each yarn-like bundle 44 is connected with other such bundles to form a continuous line or lines that may be traced throughout nonwoven fabric 40 in an interconnected pattern to form diamond shaped discontinuous portions 42.

Yarn-like bundles 44 are connected with each other and with yarn-like bundles 43 at junctures by groups of fibers common to a plurality of bundles, the fibers at such junctures being oriented in a plurality of diverse directions.

The above detailed description has been given for clearness and understanding only. No unnecesary limitations are to be understood therefrom, as modifications will be obvious to those skilled in the art.

I claim:

1. A nonwoven fabric with a plurality of patterns of groups of fiber segments that alternate and extend throughout said fabric, which comprises: a first regular pattern of yarn-like bundles of fiber segments that define areas of low fiber density, in first discontinuous portions of the fabric, the fiber segments in each of bundles being closely associated with other fiber segments in the bundle and lying generally parallel to the longitudinal axis of the bundle, each of said yarn-like bundles of fiber segments being interconnected with other bundles at junctures by groups of fibers common to a plurality of bundles, the fibers at said junctures being oriented in a plurality of diverse directions, each of said first discontinuous portions of the fabric being bounded around its perimeter by a second plurality of yarn-like bundles of fiber segments, the fiber segments in each of said bundles being closely associated with other fiber segments in the bundle and lying generally parallel to the longitudinal axis of the bundle, said second mentioned yarn-like bundles being located in continuous portions of the fabric that lie between and interconnect said discontinuous portions of the fabric and form a second regular pattern.

2. The nonwoven fabric of claim 1 in which said second mentioned yarn-like bundles are interconnected with other yarn-like bundles at junctures by groups of fibers common to a plurality of bundles, the fibers at said junctures being oriented in a plurality of diverse directions.

3. The nonwoven fabric of claim 1 in which said second mentioned yarn-like bundles are of different weight than the yarn-like bundles in said first discontinuous portions of the fabric.

4. The nonwoven fabric of claim 3 in which the yarn-like bundles in said second continuous portions of the fabric are heavier in weight than the yarn-like bundles in said first discontinuous portions of the fabric.

5. The nonwoven fabric of claim 4 in which each of said second mentioned yarn-like bundles is connected with other such bundles to form a continuous line extending throughout said fabric.

6. The nonwoven fabric of claim 5 in which the heavier yarn-like bundles extend in both the longitudinal and transverse directions of the fabric to form a rectilinear pattern of discontinuous portions of the fabric.

7. The nonwoven fabric of claim 5 in which the heavier yarn-like bundles extend in both the longitudinal and transverse directions of the fabric and the discontinuous portions of the fabric are oval in shape.

8. The nonwoven fabric of claim 5 in which said discontinuous portions of the fabric are hexagonal in shape.

9. The nonwoven fabric of claim 5 in which said discontinuous portions of the fabric are diamond shaped.

References Cited

UNITED STATES PATENTS

| | | | |
|---|---|---|---|
| 3,485,706 | 12/1969 | Evans | 161—169 X |
| 3,081,515 | 3/1963 | Griswold et al. | 28—78 |
| 3,033,721 | 5/1962 | Kalwaites | 161—150 |
| 3,486,168 | 12/1969 | Evans et al. | 161—169 |
| 2,862,251 | 12/1958 | Kalwaites | 19—161 |
| 3,353,225 | 11/1967 | Dodson et al. | 19—161 |
| 3,403,862 | 10/1968 | Dworjanyn | 239—566 |
| 3,434,168 | 3/1969 | Summers | 28—72.2 |
| 3,485,708 | 12/1969 | Ballou et al. | 161—72 |
| 3,494,821 | 2/1970 | Evans | 161—169 |
| 3,498,874 | 3/1970 | Evans et al. | 161—169 X |

ROBERT F. BURNETT, Primary Examiner

R. L. MAY, Assistant Examiner

U.S. Cl. X.R.

19—161 P; 28—72.2; 161—169

UNITED STATES PATENT OFFICE
CERTIFICATE OF CORRECTION

Patent No. 3,681,184          Dated August 1, 1972

Inventor(s) Frank Kalwaites

It is certified that error appears in the above-identified patent and that said Letters Patent are hereby corrected as shown below:

In Column 2, line 30, "predetermihed" should read --- predetermined ---.

In Column 9, line 75, "or" should read ---of---.

In Column 16, line 49, "Patent No. 3,434,168" should read --- No. 3,434,188 ---.

Signed and sealed this 3rd day of April 1973.

(SEAL)
Attest:

EDWARD M. FLETCHER, JR.          ROBERT GOTTSCHALK
Attesting Officer          Commissioner of Patents